Patented Dec. 28, 1948

2,457,204

UNITED STATES PATENT OFFICE 2,457,204

SYNTHESIS OF ESTERS

Richard E. Brooks, Wilmington, Del., assignor to E. I. du Pont de Nemours & Company, Wilmington, Del., a corporation of Delaware No Drawing. Application May 17, 1946, Serial No. 670,527

5 Claims. (Cl. 260—488)

This invention relates to the synthesis of organic oxygen-containing compounds, and more particularly to the synthesis of esters by reaction between carbon monoxide and alcohols or ethers in the presence of certain catalysts as hereinafter set forth. The invention, in more specific aspects, is directed to the synthesis of methyl acetate by reaction between methanol and carbon monoxide. The reaction whereby methyl acetate is obtained in accordance with this invention may be written as follows,

$$2CH_3OH + CO = CH_3COOCH_3 + H_2O$$

It has been known heretofore that methyl acetate can be prepared by reaction between methanol and carbon monoxide in the presence of certain catalysts, especially volatile halides such as boron trifluoride and the like. Also, it has been known that the lower aliphatic alcohols may react with carbon monoxide to form either carboxylic acids or esters thereof in the presence of catalysts such as various silicotungstates, borates, phosphates, and the like. In certain instances it has been disclosed that the nickel, cobalt and iron salts of specific oxy acids may be employed as catalysts for reaction between methanol and carbon monoxide. Nickel and cobalt halides have been mentioned as substances which may be employed simultaneously with other materials such as boron fluoride, as catalysts for this reaction, according to the prior art.

In general, all of the aforesaid processes for the reaction of methanol with carbon monoxide either involved the use of highly corrosive catalytic materials, or else gave rise to comparatively low yields of the desired products, such as acetic acid or methyl acetate.

An object of this invention is to provide an improved process for reacting alcohols or ethers with carbon monoxide. Another object is to provide a process whereby methyl acetate can be obtained from methanol and carbon monoxide in high yield without the use of highly corrosive catalytic materials. Other objects of the invention will appear hereinafter.

These objects are accomplished in accordance with this invention by reaction of methanol with carbon monoxide in the presence of a catalyst of the class consisting of metallic cobalt, cobalt oxides, and cobalt carbonyls. In general, the catalyst should be used throughout the reaction mixture, i. e. it should be dispersed or dissolved therein, or else should be in a suitable particulate form, so that effective contact between the catalyst and the reacting substances can be obtained.

The process of the invention is usually carried out at a temperature of about 100° to 325° C., preferably about 200° to 300° C. Superatmospheric pressures are generally employed. Best results are obtained at pressures within the range of about 200 to 1500 atmospheres, preferably about 400 to 1000 atmospheres.

In the practice of the present invention it has been observed that the catalysts disclosed herein direct the reaction between methanol and carbon monoxide quite exclusively to the formation of methyl acetate, rather than acetic acid, especially when conversion is kept fairly low, e. g., when an excess of methanol is present. The ester is formed selectively even when the reaction mixture contains relatively large amounts of water.

Furthermore, it has been discovered in accordance with the invention that relatively small amounts of hydrogen have a highly beneficial effect upon the rate of formation of methyl acetate from methanol and carbon monoxide in the presence of the aforesaid catalysts. It is entirely possible that this may be due to the intermediate formation of a carbonyl hydride which may be one of the active ingredients in the reaction mixture.

This invention is illustrated further by means of the following examples. It is to be understood that finely divided cobalt, or a partially reduced oxide thereof, is, to a certain extent, converted to carbonyl under the reaction conditions, and that, as an alternative, cobalt carbonyl or cobalt carbonyl hydride may be introduced as such into the reaction mixture in catalytic quantities.

*Example 1.*—A mixture containing 192 grams of methanol and 10 grams of finely divided, reduced sintered cobalt oxide catalyst was heated in a silver-lined shaker tube for one hour at a temperature of 220° C. with carbon monoxide under a pressure of 650 to 700 atmospheres. The conversion of methanol to methyl acetate was 14.9%, yield based on methanol consumed being excellent.

*Example 2.*—In order to determine the minimum temperature at which a fairly satisfactory reaction rate is obtained in the reaction between carbon monoxide and methanol an experiment was made in which a mixture containing 20 grams of reduced fused cobalt oxide catalyst and 100 c. c. of methanol in a pressure-resistant vessel having a capacity of 325 c. c. was heated under pressure of a mixture of hydrogen and carbon monoxide. The hydrogen was injected until the pressure reached 300 atmospheres, and then carbon monoxide was injected until the pressure reached 450 atmospheres at room temperature. The resulting mixture was heated to 110°, which caused the pressure to increase to 540 atmospheres. The rate of reaction as measured by the pressure-drop was very slow at 110°. The temperature therefore was increased to 120° which caused the pressure to increase to 550 atmospheres. Hydrogen was then injected into the mixture until the pressure reached 660 atmospheres, and carbon monoxide was injected until a pressure of 735 atmospheres was obtained. The rate of reaction, as measured by the pressure-drop, was rather slow at 120°, although a perceptible pressure-drop was observed in about ½ hour at that temperature. The temperature was therefore increased to 140° at which temperature the pressure decreased from 740 atmospheres to 705 atmospheres during 1 hour of operation. The resulting product was removed from the reaction vessel and distilled. A low boiling fraction containing methyl acetate was obtained.

It is to be understood that the foregoing examples are illustrative only and that the reaction conditions may be varied somewhat without departing from the spirit and scope of the invention. Catalyst concentrations do not seem to be particularly important; small quantities are sufficient and satisfactory reaction rates are obtained when the quantity of catalyst is about 2% to 10%, based on the total weight of the methanol initially present. The temperature is somewhat more critical. At temperatures of about 220° to 240° C., rates of conversion are significantly higher than at temperatures below about 200°. At temperatures above 300°, acetaldehyde and propionaldehyde are formed, and decreased yields of methyl acetate are obtained.

In general, alcohols such as ethyl alcohol, isopropanol, etc., may be substituted for methanol in the practice of the invention, but the results obtained with these higher alcohols are less satisfactory than those obtained with methanol.

The process of the present invention may be performed either batchwise or continuously. In general, the invention is practiced by introducing into a pressure-resistant vessel a reaction mixture comprising methanol, carbon monoxide, and cobalt carbonyl or its equivalent, such as finely divided cobalt metal; the reaction mixture is heated under the aforesaid conditions of temperature and pressure, after which methyl acetate is separated from the resultant product by any suitable method, such as simple distillation. The residue may be recycled with added methanol if desired.

Since many different embodiments of the invention may be made without departing from the spirit and scope thereof, it is to be understood that I do not limit myself except as set forth in the following claims.

I claim:

1. A process for the synthesis of esters which comprises introducing into a pressure-resistant vessel a reaction mixture consisting essentially of methanol, carbon monoxide and a catalyst of the class consisting of metallic cobalt, cobalt oxide, cobalt carbonyl, and cobalt carbonyl hydride, heating the said reaction mixture at a temperature of about 100° to 325° C. under a pressure of about 200 to 1500 atmospheres, and thereafter separating the resulting ester from the resulting reaction product.

2. A process for the synthesis of methyl acetate which comprises introducing into a pressure-resistant vessel a reaction mixture consisting essentially of methanol, carbon monoxide and a catalyst of the class consisting of metallic cobalt, cobalt oxide, cobalt carbonyl, and cobalt carbonyl hydride, heating the said reaction mixture at a temperature of about 200° to 300° C. under a pressure of about 200 to 1500 atmospheres, and thereafter separating methyl acetate from the resulting product.

3. A process for the synthesis of methyl acetate which comprises introducing into a pressure-resistant vessel a reaction mixture consisting essentially of methanol, carbon monoxide, hydrogen, and a catalyst of the class consisting of metallic cobalt, cobalt oxide, cobalt carbonyl, and cobalt carbonyl hydride, heating the said reaction mixture at a temperature of about 200 to 300° C. under a pressure of about 200 to 1500 atmospheres, and thereafter separating methyl acetate from the resulting reaction product.

4. The process of claim 1 in which the said catalyst is reduced sintered cobalt oxide.

5. A process for the synthesis of methyl acetate which consists substantially in heating methanol, carbon monoxide and hydrogen in the presence of about 2% to 10% by weight of a finely divided reduced sintered cobalt oxide catalyst based on the weight of methanol initially present, at a temperature of about 200° to 300° C. under a pressure of about 200 to 1500 atmospheres, and thereafter separating methyl acetate from the resulting reaction product.

RICHARD E. BROOKS.

REFERENCES CITED

The following references are of record in the file of this patent:

UNITED STATES PATENTS

| Number | Name | Date |
|---|---|---|
| 1,562,480 | Weitzel et al. | Nov. 29, 1925 |
| 1,784,583 | Dreyfus | Dec. 9, 1930 |
| 1,927,414 | Oxley | Sept. 19, 1933 |
| 1,946,256 | Woodhouse | Feb. 6, 1934 |
| 1,996,101 | Dreyfus | Apr. 2, 1935 |
| 2,117,554 | Hale | May 17, 1938 |
| 2,162,459 | Loder | June 13, 1939 |

OTHER REFERENCES

Hieber, Die Chemie, vol. 55, pages 7 to 11 (1942).